(No Model.)  2 Sheets—Sheet 1.
J. M. SHUCK.
BEE HIVE.
No. 333,168. Patented Dec. 29, 1885.
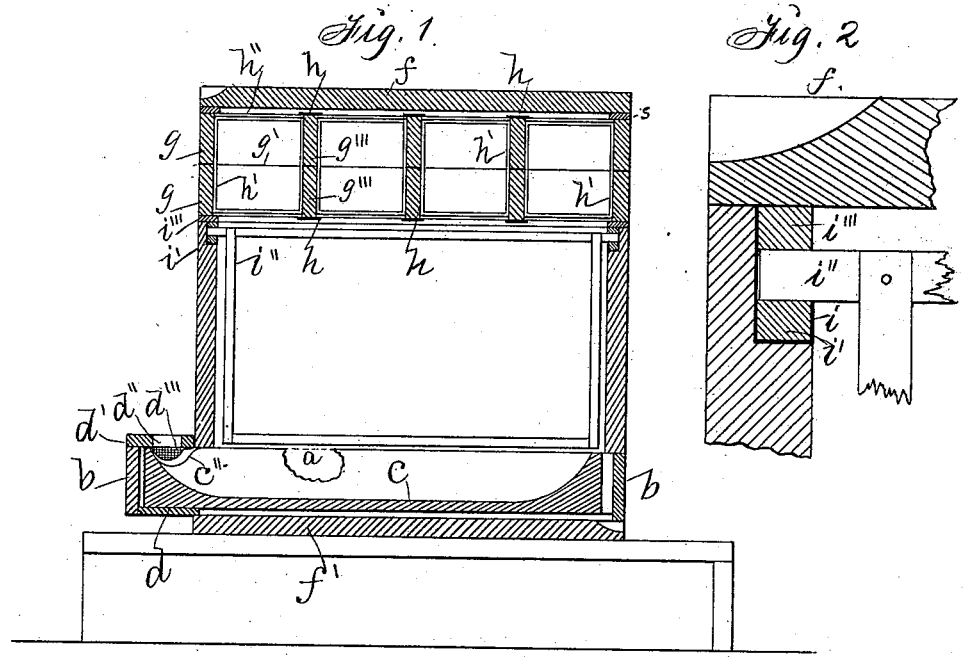
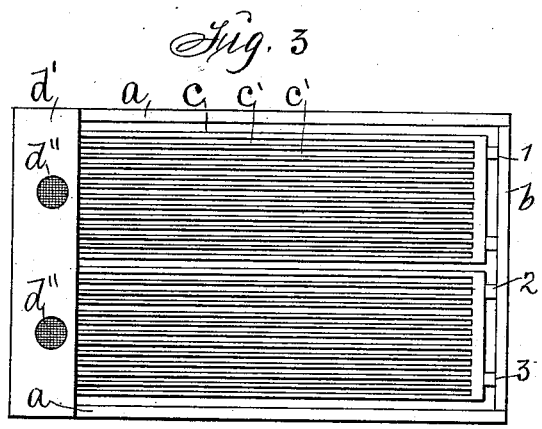
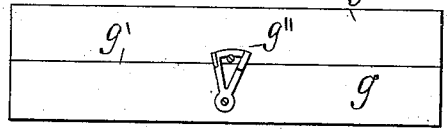
Witnesses:
W. T. Anderson,
R. H. Orwig.
Inventor:
John M. Shuck,
By Thomas G. Orwig, Attorney.

(No Model.) 2 Sheets—Sheet 2.
J. M. SHUCK.
BEE HIVE.
No. 333,168. Patented Dec. 29, 1885.
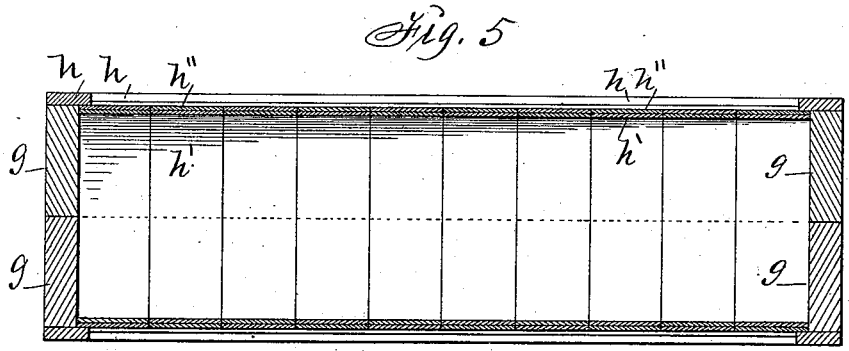
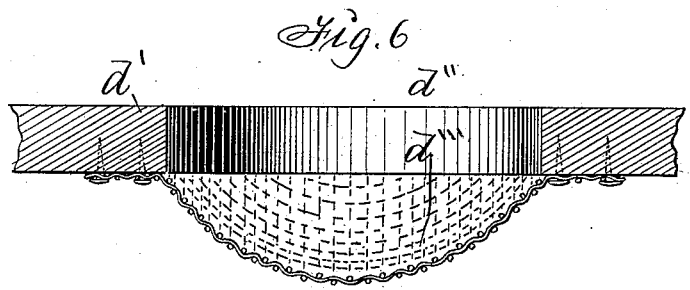
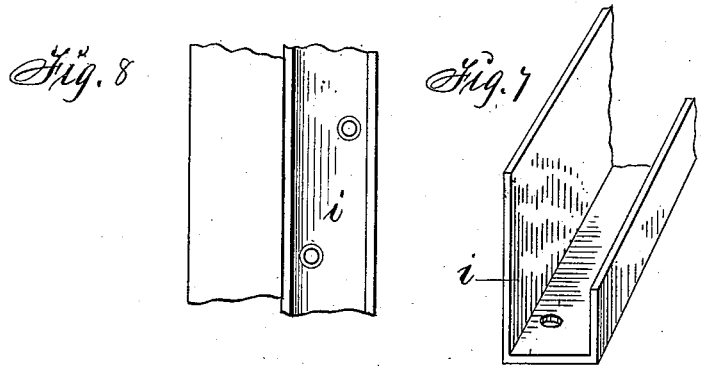
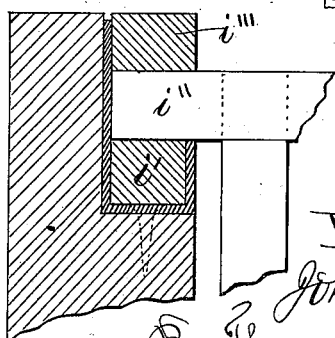
Witnesses:
C. D. Hudgens
M. A. Anderson
Inventor:
John M. Shuck
By Thomas G. Orwig, Atty

UNITED STATES PATENT OFFICE.

JOHN M. SHUCK, OF DES MOINES, IOWA.

BEE-HIVE.

SPECIFICATION forming part of Letters Patent No. 333,168, dated December 29, 1885.

Application filed February 19, 1885. Serial No. 156,356. (No model.)

*To all whom it may concern:*

Be it known that I, JOHN M. SHUCK, a citizen of the United States of America, and a resident of Des Moines, in the county of Polk and State of Iowa, have invented new and useful Improvements in Bee-Hives, of which the following is a specification.

My invention relates to improvements upon the invertible hive for which Letters Patent of the United States were issued to me, No. 329,341, October 27, 1885; and my object is, first, to combine a feeding device therewith that is adapted to be placed under or on top of the hive; second, to combine a divisible surplus-box therewith, to thereby facilitate putting in and taking out surplus frames or sections; third, to secure frames that have their bearings at their top corners in such a manner that the hive containing them can be inverted without displacing the frames.

I accomplish the results contemplated in the manner illustrated by the accompanying drawings, in which—

Figure 1 is a vertical section showing a hive, a feeder, and a surplus-box combined upon a base. Fig. 2 is an enlarged detail view showing my manner of fastening frames of common form in a hive to adapt the frames and hive to be jointly inverted. Fig. 3 is a top view of the detachable feeder. Fig. 4 is a side view of the divisible surplus-box. Fig. 5 is an enlarged view and transverse section of the divisible surplus-box. Fig. 6 is an enlarged view of the cup-shaped screen in the feeding device; Fig. 7, a perspective view of a piece of a metal bearing for honey-frames; Fig. 8, a top view, and Fig. 9 a vertical transverse section, of the wall of a hive, showing the metal frame-bearing applied.

$a\ a$ represent the side pieces, and $b\ b$ the end pieces, of the feeder, preferably made of inch boards and joined together at their ends by means of mortises and tenons. The frame or box thus formed must correspond in width with the hive, but project therefrom at one end, as shown in Fig. 1.

$c\ c$ represent pieces of wood that have a series of longitudinal and parallel grooves or troughs, $c'$, cut therein, and transverse openings $c''$ in the partitions between the troughs at the ends that project from the hive.

$d$ is a thin board fitted between the sides $a$ and against the end piece, $b$, and fixed thereto to produce a tight bottom under the projecting end of the feeder, and to support the pieces $c$.

$d'$ is a cover fixed on the top edges of the same side pieces, $a$, and end piece, $b$, against which the hive abuts when it is placed on top of the feeder, and against which the detachable hive-cover $f$ abuts when the feeder is placed on top of the hive and the cover $f$ on top of the feeder.

1 2 3 represent a series of blocks fixed to the pieces $c$ and the end $b$ of the wall of the feeder, to support the trough-pieces $c$ level and elevated sufficiently to allow bees to pass underneath the troughs when the feeder rests upon a bottom board, $f'$, and up and down at the sides of the troughs.

$d''$ are openings made through the cover $d'$ on the projecting end of the feeder, and $d'''$ are cup-shaped wire screens fixed around the openings on the under side of the cover in such a manner that they will allow liquid food to be poured through and into the multiple troughs $c'$, and at the same time prevent bees from getting out through the openings. Suitable adjustable or detachable covers may be placed over the feed-openings, to prevent dirt from entering.

I am aware that bee-feeders have projected from under a hive, so that food could be introduced through openings in the projecting part; but in no instance has a trough, tank, or other receptacle for liquid food been fixed in a case in such a manner that the walls of the case projected above and also below the receptacle, so as to produce a vacant space and bee-passage between the bottom board and the food-receptacle when under a hive, and also a corresponding space between the tops of the honey-frames and the same receptacle when the feeder is placed on top of the hive, and also a corresponding space under a cover when a flat cover is placed on top of the feeder, as required when the feeder is on top of a hive.

$g\ g$ represent the wall of my invertible surplus-box, made in two mating parts that correspond with the size and shape of the hive upon which it is placed. The horizontal dividing-line $g'$ is preferably in the center.

$g''$ represents fastening devices for clasping the two parts together.

$g'''$ are transverse and coinciding partitions fixed in the mating sections of the box. Strips $h$, preferably metal, are fixed on the edges of the partitions $g'''$ in such a manner that they will project on both sides of the partitions, to form bearings for surplus frames or sections $h'$, placed between the partitions. Corresponding strips are fixed in the top edges of the ends of the walls $g$ of the divisible box.

To insert and secure the sections $h'$, I simply separate the two parts of the box, and then place the sections in one of them to rest upon the flanges formed by the strips $h$, and to project above the wall and partitions. I next place the mating part of the box over the projecting sections and on top of the under part, and fasten the two parts together by means of adjustable clasps $g''$. The strips $h$ in the upper part will then overlap the top corners of the sections, and the lower corners of the sections rest upon the strips in the lower part, so that the sections will be firmly held in place, as required, to invert the surplus-box without displacing any of the detachable surplus-sections. The strips $h$, when a surplus-box is placed on top of a hive or on top of a corresponding surplus-box, prevent the surfaces of the honey-sections from crushing bees, by maintaining a vacant space over the surface of each honey-section which may be covered with bees, and also establish horizontal bee-passages under and over each row of removable honey sections.

$h''$ represents pieces of veneering placed on the outside of the horizontal portions of the sections $h'$, to prevent the bees from soiling the outside surfaces of the surplus-sections. When a surplus-box is thus filled with sections, the cover $f$ of the hive is taken off and the surplus-box put in its place, and the cover is put on top of the surplus-box, as shown in Fig. 1.

To induce the bees to fasten the honeycombs to the lower portions of the honey-sections, I simply take off the cover, invert the surplus-box, and then replace the box and the cover.

To remove the honey and sections, I remove the cover, unfasten the separable parts of the box, and lift the upper part off to uncover the upper portions of the sections, which I then in succession seize with my fingers and remove from the lower part of the surplus-box.

$i$ (clearly shown in Fig. 2) represents a metal strip that is L-shaped in its cross-section, and fitted and fixed in a rabbet in a common way in the top of a wall of a hive, as heretofore practiced in suspending common frames in hives.

$i'$ is a strip of wood fitted in the groove of the bent metal strip. The vertical edges of the rabbet are thus lined with metal, to prevent the bees from attaching propolis, while the horizontal surface upon which the ends of the frames rest are wood, upon which the bees will deposit propolis, to aid in preventing the frames from sliding out of place when the line is inverted.

$i''$ represents the end of a common frame, resting in the metal-lined rabbet of a hive of common form.

$i'''$ represents removable wooden strips placed across the top surfaces of the ends of the suspended frames, and engaged and pressed down by the cover $f$, to clamp the frames fast in the metal-lined rabbet in such a manner that the hive and frames can be jointly inverted without displacing any of the frames, and the frames retained perpendicular in an inverted position, as required, to induce the bees to extend and fasten their combs at the bottom bar of a frame of common form. By thus placing a wooden strip under the frames and another wooden strip on top of the frames I adapt hives and frames of common form to be inverted.

$s$ $s$ represent mating sections of metal sockets, fixed against the outside faces of the two mating wall-sections in such a manner as to adapt the sockets to receive the pins that are adjustably connected with a device for lifting, revolving, and inverting a hive.

I am also aware that two or more honey-sections or surplus-boxes of uniform shape and size have been combined and placed over a brood-chamber; but each section or box was complete in itself, and designed to be filled with removable sections or frames.

My complete invertible surplus-box is composed of two mating parts that are indispensable to each other, and that must be jointly used to inclose and carry and invert removable honey-sections.

I claim as my invention—

1. A bee-feeder consisting of a rectangular frame having a narrow bottom at one end, and a corresponding narrow cover at the same end, provided with one or more openings to admit liquid food, and a food-receptacle of smaller dimensions and less depth than the said frame, fixed within the frame to extend over the said narrow bottom and under the said narrow cover, in combination with the top or bottom of a hive, in the manner set forth, for the purposes stated.

2. The bee-feeding device composed of the wall $a$ $b$, having a fixed bottom section, $d$, and a fixed cover-section, $d'$, provided with openings $d''$ and screens $d'''$, and wooden pieces $c$, having parallel troughs $c'$, and openings through the partitions between the troughs, to allow liquid food introduced through the openings $d''$ to flow into the combined series of troughs.

3. An invertible surplus-box for bee-hives, composed of two mating sections that are open at their tops and bottoms and have coinciding transverse partitions, and projecting strips fixed on the top edges of the upper section and on the bottom edges of the lower section, and fastening devices attached to the outside faces of the two sections, to operate in the manner set forth, for the purposes stated.

4. The honey surplus-box composed of the sections $g$, having fastening devices $g''$ on their outsides, and fixed partitions $g'''$ on their insides, and strips $h$, fixed on the edges of the partitions, substantially as and for the purposes specified.

JOHN M. SHUCK.

Witnesses:
THOMAS G. ORWIG,
R. H. ORWIG.